United States Patent
Hosogane et al.

(10) Patent No.: US 8,495,953 B2
(45) Date of Patent: Jul. 30, 2013

(54) APPARATUS FOR MOLDING COOKED RICE

(75) Inventors: Takashi Hosogane, Machida (JP); Atsushi Numabe, Machida (JP)

(73) Assignee: Kabushiki Kaisha Audio-Technica, Machida-Shi (JP)

( * ) Notice: Subject to any disclaimer, the term of this patent is extended or adjusted under 35 U.S.C. 154(b) by 206 days.

(21) Appl. No.: 12/461,874

(22) Filed: Aug. 27, 2009

(65) Prior Publication Data
US 2011/0048249 A1   Mar. 3, 2011

(51) Int. Cl.
*A22C 7/00* (2006.01)

(52) U.S. Cl.
USPC .............................. 99/426; 99/450.6; 219/413

(58) Field of Classification Search
USPC ............. 99/349, 353, 355, 450.1–450.2, 426, 99/352, 377, 331, 380, 449, 428, 494, 450.6, 99/450.7, 451, 524, 525, 530; 219/700, 702, 219/704, 705, 762, 392, 388, 518; 425/112, 425/383, 110, 319, 308, 328, 298, 343, 204
See application file for complete search history.

(56) References Cited

U.S. PATENT DOCUMENTS

| | | | | |
|---|---|---|---|---|
| 3,783,820 A * | 1/1974 | Hautly et al. | | 118/19 |
| 4,150,609 A * | 4/1979 | McClean | | 99/372 |
| 4,469,709 A * | 9/1984 | Schrauf | | 426/231 |
| 5,307,736 A * | 5/1994 | Sorensen | | 99/330 |
| 5,534,679 A * | 7/1996 | Beaver et al. | | 219/413 |
| 5,873,301 A * | 2/1999 | Satake et al. | | 99/488 |
| 6,263,783 B1 * | 7/2001 | Liu | | 99/339 |
| 6,352,020 B2 * | 3/2002 | Uchida et al. | | 99/450.6 |
| 7,220,945 B1 * | 5/2007 | Wang | | 219/392 |
| 2006/0191920 A1 * | 8/2006 | Cho et al. | | 219/739 |
| 2009/0090347 A1 * | 4/2009 | Kim et al. | | 126/21 A |

* cited by examiner

*Primary Examiner* — Henry Yuen
*Assistant Examiner* — Phoung Nguyen
(74) *Attorney, Agent, or Firm* — Manabu Kanesaka

(57) ABSTRACT

There is provided a cooked rice molding apparatus which enables a rice mat to be easily moved and the rice mat to be stored. A rice mat formed into a plate shape by a forming section 3 is spread over a pick plate 5 placed on a slide tray 4, and the rice mat, along with the pick plate 5, is removed from the slide tray 4.

12 Claims, 4 Drawing Sheets

APPARATUS FOR MOLDING COOKED RICE

TECHNICAL FIELD

The present invention relates to a cooked rice molding apparatus which makes a rice mat for norimaki and, more particularly, to a cooked rice molding apparatus which can mass produce rice mats and can store rice mats without loosing shapes thereof.

BACKGROUND ART

To mechanically produce norimaki, there has been provided a cooked rice molding apparatus as shown in Japanese Patent Application Publication No. 2002-45129, for example. In this cooked rice molding apparatus, a rice mat which is formed by rolling sushi rice supplied from a hopper into a plate shape by use of a forming roller, is placed on a wrapping unit on a slide tray and is then rolled together with a sheet of laver and molded into a rod shape by deforming the wrapping unit into a cylindrical shape.

In recent years, people often eat sushi also in districts other than Japan. Also, eating practices peculiar to foreign countries have been developed. In the case of norimaki called the California roll, for example, the norimaki is rolled by placing a sheet of laver on a rice mat and then placing an ingredient on the sheet of laver.

According to the California roll, it is possible to add flair to new sushi because the sushi rice is rolled so as to face the outside. This kind of norimaki including the California roll is otherwise called an inside-out roll.

However, the above-described cooked rice molding apparatus is used to produce conventional norimaki in which the sushi rice is on the inner side and the laver is on the outer side, and cannot produce inside-out rolls which require delicate rolling techniques.

Therefore, conventionally, in making inside-out rolls, only a rice mat has been automatically made, with the wrapping unit removed from the slide tray, and the remaining work has been carried out manually. That is, a rice mat is spread over on the slide tray, a sheet of laver is placed on the rice mat, and the rice mat and the sheet of laver are caused to adhere to each other. Next, the rice mat is lifted up by hand, is taken onto another work table, ingredients are placed on the rice mat, and an inside-out roll is rolled by hand.

However, the conventional manufacturing process of inside-out rolls had problems as described below. That is, after the sheet of laver is placed on the rice mat, the two are caused to adhere to each other and hereafter moved onto a work table or the like. Therefore, during conveyance, inside-out rolls might loose their shapes or the cooked rice might fall. In temporarily storing a rice mat which has been made, the rice mat is placed on a wrap and the like, and another wrap is further placed on the rice mat to form a stack. However, the rice mat might be deformed by its own weight.

Hence, the present invention has been made to solve the above-described problems, and the object of the invention is to provide a cooked rice molding apparatus which enables a rice mat to be easily moved and to be stored.

SUMMARY OF THE INVENTION

To achieve the above-described object, the present invention has some features described below. In a cooked rice molding apparatus including a hopper which supplies sushi rice, at least a pair of forming rollers which rotate in directions opposite to each other around a prescribed horizontal axis of rotation, a forming section which forms a rice mat by rolling the sushi rice into a plate shape by use of the forming roller, a cutter unit which cuts the rice mat into prescribed lengths, and a slide tray on which the rice mat is placed, the slide tray is provided with a pick plate which catches a rice mat supplied from the forming section, and the pick plate is detachable from the slide plate.

According to this feature, the slide plate is provided with a detachable pick plate and hence by placing a rice mat on the pick plate, it is possible to easily move the rice mat along with the pick plate simply by lifting up the rice mat from the slide tray.

As a more preferred aspect, the pick plate is provided with a grip which is grasped by hand.

According to this feature, it is possible to lift up the pick plate while grasping the grip. This permits easy movement and in addition this is desirable in terms of food sanitation.

As a still more preferred aspect, the pick plate can catch the rice mat on both a front surface and a back surface thereof.

According to this feature, with a rice mat placed on the pick plate, another pick plate is superposed thereon, whereby it is possible to store rice mats which are stacked easily and in an orderly manner.

The slide tray has a positioning surface of the pick plate with respect to the slide tray and the positioning surface is provided with a sensor unit which checks whether the rice mat is present or absent.

According to this feature, a sensor unit which checks whether the rice mat is present or absent is provided on the positioning face of the pick plate. Therefore, it is possible to save useless spaces and materials and it is possible to obtain a simpler configuration.

The slide tray is further provided with a stopper which restricts the movement of the pick plate in a sliding direction between the slide tray and the positioning surface.

According to this feature, a stopper which restricts the movement of the pick plate and, therefore, it is possible to positively prevent the rice mat from being placed outside the pick plate.

As a more preferred aspect, a lighting device which lights up the sushi rice inside the hopper and/or the slide tray is further provided.

According to this feature, the provision of a lighting device also enables work in a dim place to be positively performed. Also, a cooked rice molding apparatus is displayed as an object in a shop and the manufacturing process of rice mats is exhibited to customers, whereby it is possible to establish a new business mode.

DETAILED DESCRIPTION

An embodiment of the present invention will now be described with reference to the accompanying drawings.

Figure 1:
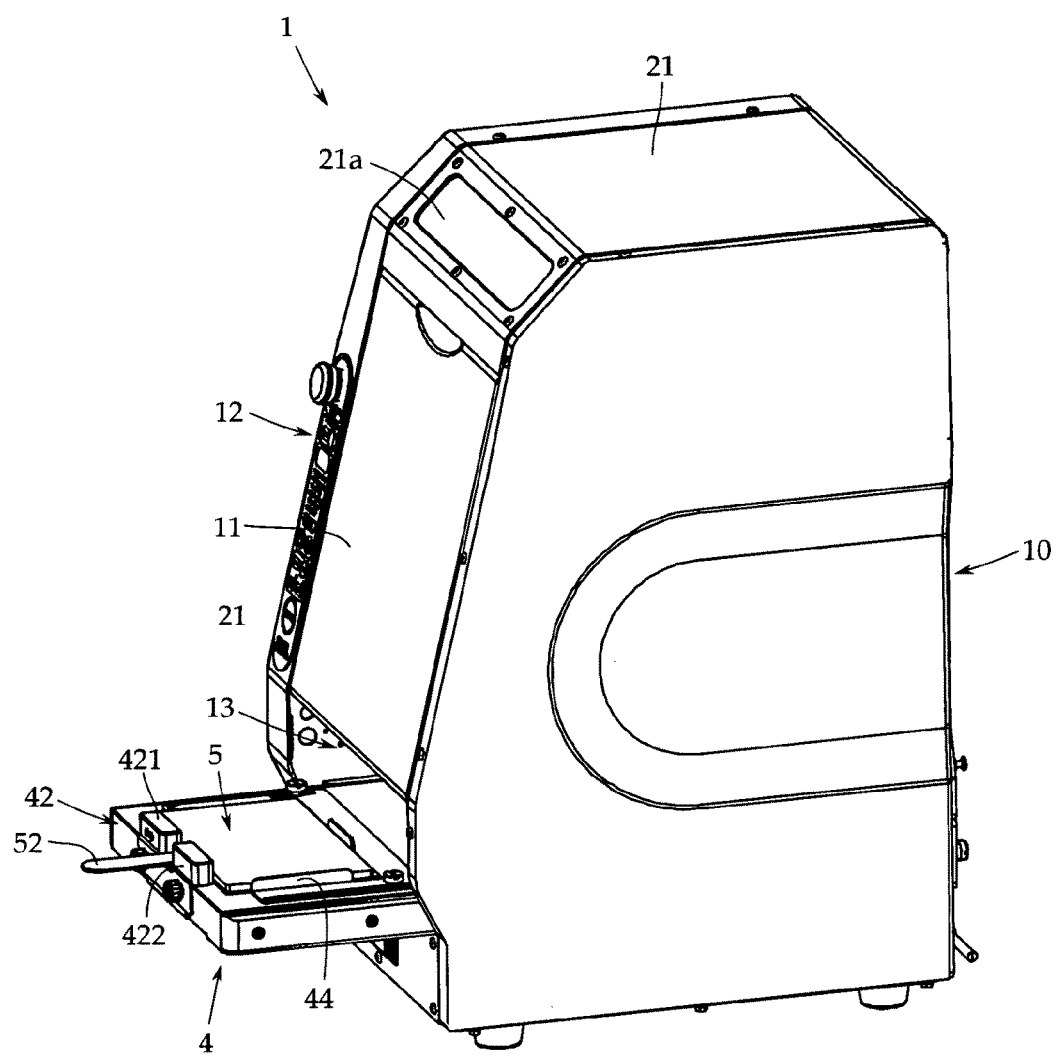
FIG. 1 is a perspective view of a cooked rice molding apparatus in an embodiment of the present invention.
Figure 2:
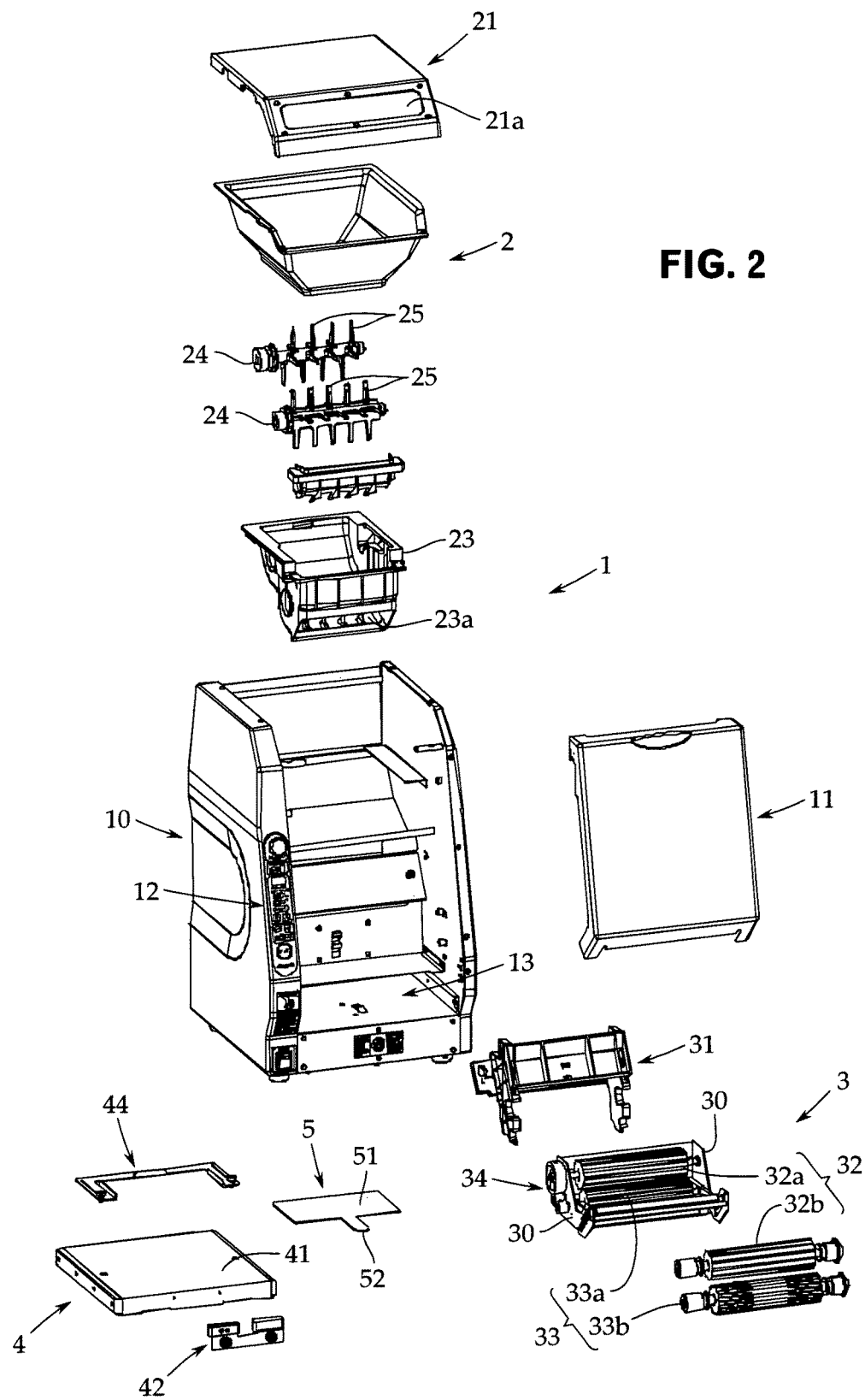
FIG. 2 is an exploded perspective view of the above-described cooked rice molding apparatus.

However, the present invention is not limited to this embodiment. As shown in FIGS. 1 and 2, this cooked rice molding apparatus 1 is provided with a housing 10 the whole of which is covered with a decorative panel made of synthetic resin. The decorative panel may also be made of metal. On the front surface of the housing 10, there is provided a front cover 11 for hiding the internal construction so as to be detachable from the housing 10.

On the front surface of the housing 10, there is further provided a control panel 12 for operating the cooked rice molding apparatus 1. In this embodiment, the control panel 12 is provided on the left-hand front surface of the housing 10 as you face. On the control panel 12, there are arranged various kinds of setting buttons for setting the amount of sushi rice, the number of molded rolled sushi, etc., and a display section as well as a power switch, an emergency stop switch and the like. In the present invention, the configuration of the control panel 12 is optional.

The housing 10 is provided with a hopper 2 into which sushi rice is charged, a forming section 3 which rolls sushi rice supplied from the hopper 2 and forms the sushi rice into a plate-like rice mat, and a slide tray 4 which catches the rice mat.

The hopper 2 is formed in the shape of a funnel whose upper surface is open and whose volume decreases gradually from the upper part to the lower part of the housing 10. A hopper lid 21 which stops up an upper surface opening is provided in an upper part of the hopper 2. The lid 21 is detachably provided on the upper surface of the hopper 2, and a window 21a for checking the remaining amount of sushi rice in the hopper 2 is provided in part of the front surface side.

Downstream of the hopper 2, there is provided a stirring section 22 which causes sushi rice to forcedly flow to the downstream side while stirring the sushi rice. The stirring section 22 is provided with a hopper base 23 which is connected to an opening of the hopper 2 and two stirring shafts 24, 24 which are rotationally driven via driving means (not shown). In this embodiment, the individual stirring shafts 24, 24 are designed to provide different numbers of rotation via intermediate gears having gear ratios different from each other.

The hopper base 23 is formed in such a manner that the volume decreases gradually from the upstream side to the downstream side, and the stirring shafts 24, 24 are rotatably provided to span the inside of the hopper base 23. On the downstream side of the hopper base 23, there is provided an opening 23a which is opened toward the forming section 3.

Each of the stirring shafts 24 is provided with a plurality of combs 25 at prescribed intervals. The plurality of combs 25 are formed radially with respect to the axis of rotation of the stirring shaft 24. The shape and number of the combs 25 may be optionally selected according to specifications.

The forming section 3 is provided with a rice guide 31 which guides sushi rice pushed out of the opening 23a of the hopper base 23 to the forming section 3, an upper forming roller pair 32 which rolls the sushi rice onto a rice mat, and a lower forming roller pair 33 which is arranged downstream of the upper forming roller pair 32. As shown in FIG. 2, the upper forming roller pair 32 and the lower forming roller pair 33 are rotatably provided to span a pair of support plates 30, 30. In this embodiment, the forming section 3 uses a two-high rolling method which involves forming a rice mat rolled by the upper forming roller pair 32 by further performing rolling by use of the lower forming roller pair 33.

Figure 3:
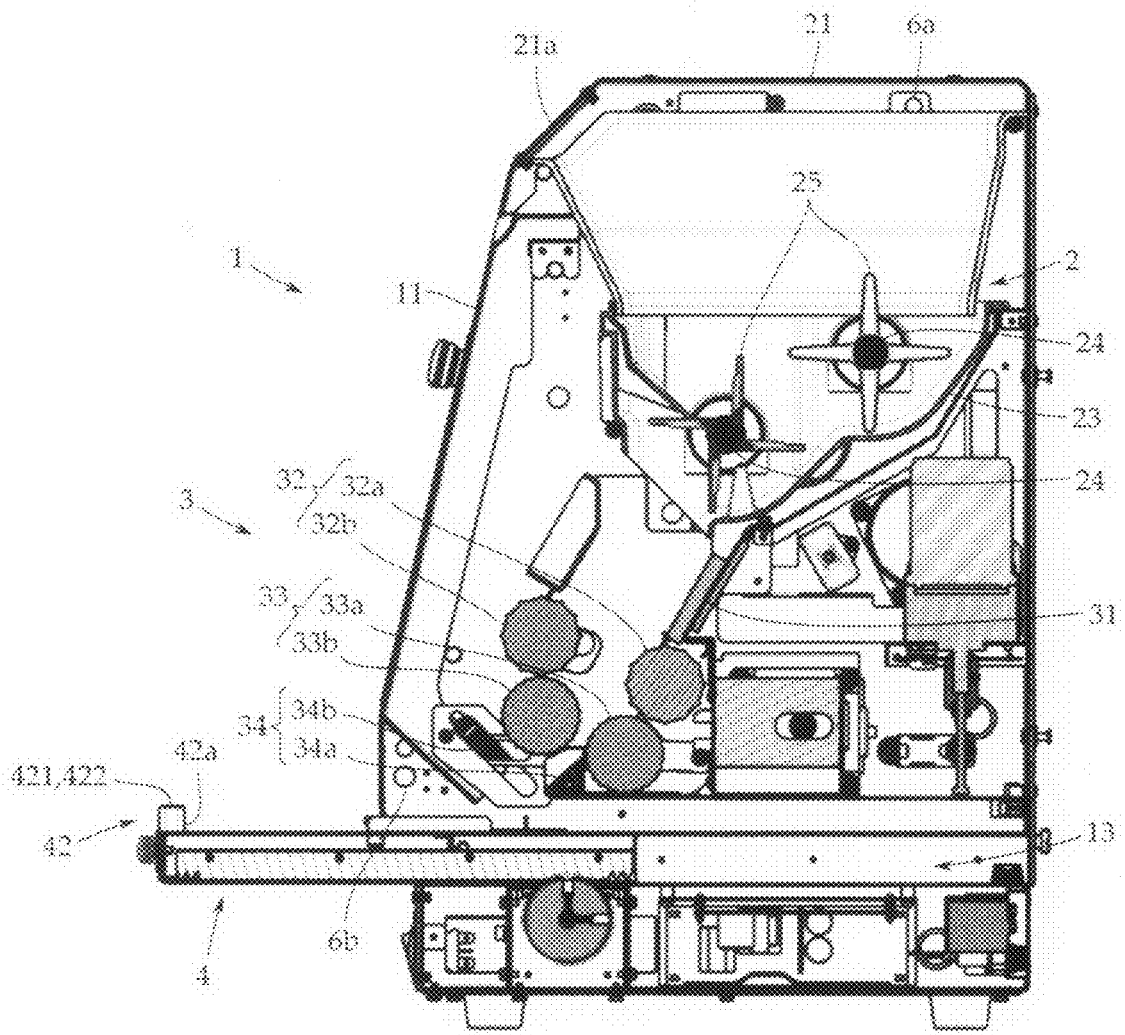
FIG. 3 is a longitudinal sectional view of the middle of the above-described cooked rice molding apparatus whose internal construction is partially omitted.

Referring to FIG. 3 in addition to FIG. 2, the upper forming roller pair 32 is provided with an upper feeding roller 32a which is driven by unillustrated driving means and an upper forming roller 32b which is arranged parallel to the upper feeding roller 32a with a prescribed spacing. The upper feeding roller 32a and the upper forming roller 32b are adapted to feed sushi rice to between the rollers by rotating in directions opposite to each other via prescribed gears.

The lower forming roller pair 33 is provided with a lower feeding roller 33a which is driven by unillustrated driving means and a lower forming roller 33b which is arranged parallel to the lower feeding roller 33a with a prescribed spacing. Also the lower feeding roller 33a and the lower forming roller 33b rotate similarly in directions opposite to each other via prescribed gears, whereby sushi rice is fed to between the rollers. In this embodiment, each of the feeding rollers 32a, 33a rotates counterclockwise. Each of the forming rollers 32b, 33b rotates clockwise.

On the exit side of the lower forming roller pair 33, there is provided a cutter unit 34 for cutting a rice mat into prescribed lengths. As show in FIG. 3, the cutter unit 34 is provided with a cutting board 34a which is provided adjacent to an exit of the lower forming roller pair 32 and a cutting knife 34b which moves toward and away from the cutting board 34a via unillustrated driving means. Also the cutting knife 34b is supported by support plates 30, 30.

In the present invention, concrete configurations of the hopper 2 and the forming section 3 are optional and the shape, arrangement and the like thereof can be optionally changed.

Again referring to FIGS. 1 and 2, the cooked rice molding apparatus 1 is provided with a tray mounter 13 which houses the slide tray 4 catching a rice mat so that the slide tray 4 can slide backward and forward.

The tray mounter 13 provides a substantially horizontal surface along the surface on which the housing 10 is installed and is formed from the back surface to the front surface of the housing 10. Although in this embodiment, the tray mounter 13 is provided so as to be horizontal to the surface on which the housing 10 is installed, the tray mounter 13 may also be inclined in consideration of workability.

The slide tray 4 comprises a rectangular tray which slides backward and forward along a stage by use of a rack and pinion mechanism connected to unillustrated driving means. However, in addition to this, the slide tray 4 may be of a linear driving method.

Figure 4:
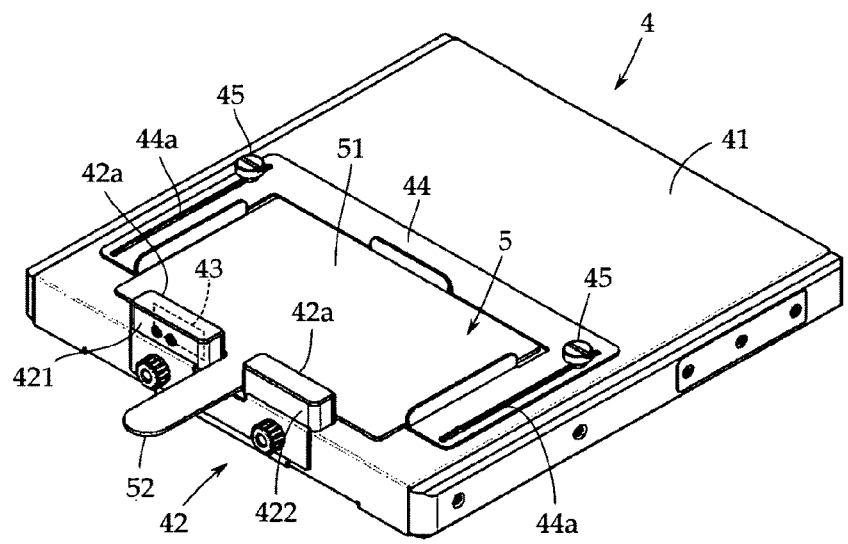
FIG. 4 is a perspective view of a state in which a pick plate is placed on a slide tray.

As shown in FIG. 4, a flat tray surface 41 is formed as an upper surface of the slide tray 4 to catch a rice mat. At a forward end of the tray surface 41 (the left end side in FIG. 3), there are provided positioning portions 421, 422 as positioning means 42 of a pick plate 5, which will be described later. Referring to FIG. 4 in addition to FIG. 3, the positioning portions 421, 422 are provided in a pair at a prescribed interval along the forward end of the slide tray 4, and each of the positioning portions 421, 422 is provided with a positioning surface 42a which abuts along an end surface of the pick plate 5.

The installation spacing between the positioning portions 421, 422 is set to prove almost the same width as the width of the grip 52 of the pick plate 5. Thereby, as shown in FIG. 4, the grip 52 is arranged so as to be sandwiched between the positioning portions 421 and 422 and an end edge of a receiving surface 51 of the pick plate 5 is caused to abut along the positioning surface 42a, whereby it is possible to easily perform the positioning of the pick plate 5.

One of the positioning portions 421, 422, i.e., the positioning portion 421 (the left-hand one in FIG. 4) is provided with a rice mat sensor 43 which detects the presence or absence of a rice mat. The rice mat sensor 43 comprises a reflection-type sensor which is housed inside the positioning surface 42a, and the positioning surface 42a is provided with an unillustrated window into which sensor light is emitted.

In this embodiment, the rice mat sensor 43 is a reflection-type sensor and a reflecting plate (not shown) for causing the sensor light to reflect is provided in the back of the tray mounter 13. Sensors other than a reflection type may also be used as the rice mat sensor 43 so long as they can detect the presence and absence of a rice mat.

The slide tray 4 is further provided with a stopper 44 to ensure that the pick plate 5 placed on the tray surface 41 does not shift due to a slide action of the slide tray 4.

As shown in FIG. 4, the stopper 44 comprises a part obtained by blanking a metal plate and is formed so as to abut along three sides of a pick plate 5 other than a side where a grip 52 is provided. The stopper 44 is provided with slide grooves 44a, 44a for causing the stopper 44 to slide along the receiving surface 51.

The stopper 44 is fixed to the tray surface 41 by use of each fixing screw 44a, 44a. The fixing screws 45, 45 are arranged so as to pierce the slide grooves 44a, 44a and the loosening of the fixing screw 45 enables the stopper 44 to move along the receiving surface 51. According to this feature, it is possible to adapt the stopper 44 to the size of the pick plate 5.

Figure 5A:
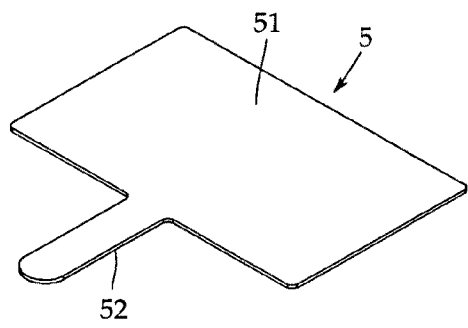
FIG. 5A is a perspective view of the pick plate.

Referring to FIG. 5A, the pick plate 5 is provided with the receiving surface 51 which catches a rice mat delivered from the forming section 3 and the grip 52 which is grasped by hand when the pick plate 5 is moved. The pick plate 5 comprises a part obtained by blanking a plate material made by synthetic resin, such as PET. The receiving surface 51 is formed into a rectangular shape having an area substantially corresponding to one rice mat. It is preferred that the receiving surface 51 be embossed in order to prevent the sushi rice from sticking to the receiving surface 51 when a rice mat is placed on the receiving surface 51. The pick plate 5 may be subjected to antibacterial finishing and the like because food products are placed thereon.

The pick plate 5 is provided with the receiving surface 51 each on a front surface and on a back surface thereof. According to this feature, because there is no discrimination between a front surface and a back surface, the storage is easy and in addition, it is possible to stack a plurality of pick plates 5, with a rice mat placed on each pick plate 5.

Figure 5B:
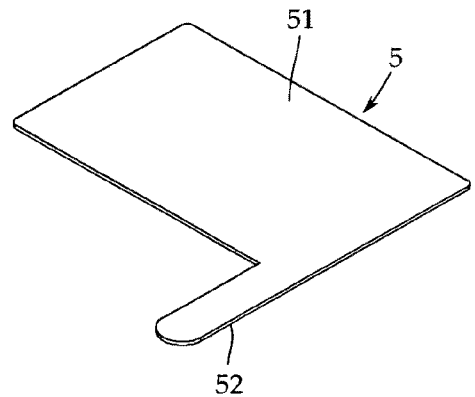
FIG. 5B is a perspective view showing a modification of the pick plate.

In this embodiment, the grip 52 is provided so as to protrude from the middle of an end of the pick plate 5. However, as shown in FIG. 5B, the grip 52 may also be provided so as to protrude from the corner side of an edge portion. The position and shape of the grip 52 may be optionally set according to specifications.

Incidentally, in the countries in Europe and America, sushi is often made in a dim environment called "SUSHI BAR" and not in sushi shops as seen in Japan. Therefore, as shown in FIG. 3, this cooked rice molding apparatus 1 is provided with a first lighting unit 6a for lighting the inside of the hopper 2 and a second lighting unit 6b which lights up the surrounding area of the slide tray 4.

The first lighting unit 6a is provided on a side surface which receives the hopper 2 of the housing 10. The second lighting unit 6b is similarly provided on a side surface of the tray mounter 13 of the housing 10. A high-luminance blue LED is used in both the first lighting unit 6a and the second lighting unit 6b. According to this feature, it is possible to easily get to know the remaining amount of sushi rice in the hopper 2 and the presence or absence of a rice mat even in a dim environment. Furthermore, it is possible to add flair by displaying the manufacturing process of rice mats to customers. Although high-luminance LED lamps are used in the first and second lighting units 6a, 6b, lighting elements other than the high-luminance LED lamps may be used and the color and brightness of the first and second lighting units 6a, 6b can be optionally changed according to specifications.

Next, referring to FIG. 3 again, a description will be given of an example of procedure for using this cooked rice molding apparatus 1. First, sushi rice prepared beforehand by mixing cooked rice and sushi vinegar is charged into the hopper 2. At the same time, the pick plate 5 is set on the receiving surface 41 of the slide tray 4. Next, a power switch provided on the control panel 12 is turned on, whereby the stirring shafts 24, 24 in the hopper 2 rotate.

The sushi rice charged into the hopper 2 is pushed down gradually to the downstream side while being made loose by the stirring shaft 24, and reaches the inlet of the upper forming roller pair 32 of the forming section 3 while being guided along the rice guide 31. Next, the worker sets the size and thickness of a rice mat to be molded, the number of rice mats and the like by operating the control panel 12, and then presses a molding start button (not shown).

When the start button is operated, an unillustrated control section issues an command to the forming section 3 and causes the upper forming roller pair 32 and the lower forming roller pair 33 to rotate in the feeding direction. The sushi rice guided into the forming section 3 is first roughly rolled by the upper forming roller pair 32. Next, the sushi rice is fed into the lower forming roller pair 33 and is formed into rice mats having a thickness set by the lower forming roller pair 33.

The control section simultaneously issues a command to a driving motor of the slide tray 4 and causes the slide tray 4 to be on standby at the outlet of the forming section.

When the rice mat is caused to forcedly flow downstream of the forming section 3, the control section causes the slide tray 4 to slide forward (in the left-hand direction from the right-hand direction in FIG. 2) according to the flow speed of the rice mat, and the rice mat is placed gradually from the forward end of the receiving surface 51 of the pick plate 5. When a prescribed length of the sushi rice has been delivered, the control section ejects the cutting knife 34b to cut the rice mat.

When the rice mat has been placed on the pick plate 5, the control section checks the presence or absence of the rice plate by use of the rice mat sensor 43. Thereafter, when the control section judges that there is a rice mat, the control section causes the slide tray 4 to move to the front surface side of the tray mounter 13 and the worker is informed of the completion of work by means of sound and the like. At this time, the cooked rice molding apparatus 1 is temporarily brought into a standby condition. At this time, the worker takes the pick plate 5 from the slide tray 4 by grasping the grip 52 and places the pick plate 5 on another work table.

When the pick plate 5 has been removed, the rice mat sensor 43 detects this and the control section judges that there is no rice mat and waits for the next work start order. When rice mats are to be manufactured subsequently, the worker places a new pick plate 5 on the slide tray 4 and presses the work start button provided on the control panel 12. Whereby, the control section repeats the above-described series of production steps of rice mats.

Incidentally, in this embodiment, the description has been given of a manual operation mode in which rice mats are manually produced one by one. However, it is possible to adopt a timer operation mode in which rice mats are automatically produced at constant time intervals. Control methods of the manufacture of rice mats may be optionally selected according to specifications.

The invention claimed is:

1. A cooked rice molding apparatus comprising:
   a hopper adapted to provide cooked rice;
   a forming section adapted to roll the cooked rice into a plate shape and disposed below the hopper, said forming section having a plurality of forming rollers horizontally rotatable in directions opposing each other;
   a cutting unit adapted to cut a rice sheet formed of the cooked rice into a prescribed length and disposed below the plurality of forming rollers;
   a slide tray disposed below the cutting unit;
   a pick plate placed on the slide tray to receive the rice sheet from the forming section;
   a positioning device disposed at a front side of the slide tray and contacting a front edge of said pick plate for positioning said pick plate relative to the slide tray; and
   a sensor unit disposed in said positioning device and formed of a reflection sensor emitting a sensor light adapted to detect presence of the rice sheet on the pick plate.

2. The cooked rice molding apparatus according to claim 1, wherein the pick plate comprises a grip adapted to be gripped by hand.

3. The cooked rice molding apparatus according to claim 2, wherein the positioning device comprises at least two positioning portions in which a distance between said at least two positioning portions is same as a width of the grip of the pick tray.

4. The cooked rice molding apparatus according to claim 3, wherein the reflection sensor is located in one of the at least two positioning portions.

5. The cooked rice molding apparatus according to claim 1, wherein the pick plate is adapted to receive the rice sheet on both a front surface and a back surface thereof.

6. The cooked rice molding apparatus according to claim 1, further comprising a lighting device lighting an inside of the hopper or the slide tray.

7. The cooked rice molding apparatus according to claim 1, wherein the positioning device comprises two positioning portions facing and contacting the front edge of the pick plate, and spaced apart from each other.

8. The cooked rice molding apparatus according to claim 7, wherein the positioning portions respectively have a positioning surface directly contacting the front edge of the pick plate.

9. A cooked rice molding apparatus, comprising:
   a hopper adapted to provide cooked rice;
   a forming section adapted to roll the cooked rice into a plate shape and disposed below the hopper, said forming section having a plurality of forming rollers horizontally rotatable in directions opposing each other;
   a cutting unit adapted to cut a rice sheet formed of the cooked rice into a prescribed length and disposed below the plurality of forming rollers;
   a slide tray disposed below the cutting unit;
   a pick plate placed on the slide tray to receive the rice sheet from the forming section;
   a positioning device disposed at a front side of the slide tray and contacting a front edge of said pick plate for positioning said pick plate relative to the slide tray;
   a sensor unit disposed in said positioning device and formed of a reflection sensor emitting a sensor light adapted to detect presence of the rice sheet on the pick plate; and
   a stopper movably disposed on the slide tray for restricting a movement of the pick plate, wherein said stopper includes a plate member attached to a surface of the slide tray, a slide groove arranged on the plate member, and a fixing member arranged in the groove and extending through the plate member in a thickness direction thereof.

10. The cooked rice molding apparatus according to claim 9, wherein the plate member has a first member, a second member and a third member abutting to an outer perimeter of the pick plate, the first and second members facing each other and the third member extending between the first and second members.

11. The cooked rice molding apparatus according to claim 10, wherein the pick plate is removably arranged on the slide tray to continuously manufacture the rice sheet on the pick plate.

12. A cooked rice molding apparatus comprising:
   a hopper adapted to provide cooked rice;
   a forming section adapted to roll the cooked rice into a plate shape and disposed below the hopper, said forming section having a plurality of forming rollers horizontally rotatable in directions opposing each other;
   a cutting unit adapted to cut a rice sheet formed of the cooked rice into a prescribed length and disposed below the plurality of forming rollers;
   a slide tray disposed below the cutting unit;
   a pick plate placed on the slide tray to receive the rice sheet from the forming section;
   a positioning device disposed at a front side of the slide tray and contacting a front edge of said pick plate for positioning said pick plate relative to the slide tray; and
   a sensor unit disposed in said positioning device and formed of a reflection sensor emitting a sensor light adapted to detect presence of the rice sheet on the pick plate,
   wherein the pick plate includes a rectangular portion for receiving the rice sheet thereon, and a grip extending from a middle area of one side of the rectangular portion; and the positioning device includes two positioning portions spaced apart from each other so that when the pick plate is placed on the slide tray, the grip extends outwardly from the slide tray between the two positioning portions.

* * * * *